(12) United States Patent
Silver et al.

(10) Patent No.: US 7,580,873 B1
(45) Date of Patent: Aug. 25, 2009

(54) ELECTRONIC FINANCIAL ASSISTANT

(75) Inventors: Edward Michael Silver, Atlanta, GA (US); Linda Ann Roberts, Decatur, GA (US); Hong Thi Nguyen, Atlanta, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1372 days.

(21) Appl. No.: 10/200,876

(22) Filed: Jul. 23, 2002

(51) Int. Cl.
*G06Q 40/00* (2006.01)

(52) U.S. Cl. ............... 705/35; 705/28; 705/37; 705/40; 705/400; 382/313; 235/379

(58) Field of Classification Search ........... 705/28, 705/35, 37, 40, 400; 382/313; 235/379
See application file for complete search history.

(56) References Cited

U.S. PATENT DOCUMENTS

| | | | | |
|---|---|---|---|---|
| 4,949,079 | A * | 8/1990 | Loebner | 345/180 |
| 5,365,589 | A * | 11/1994 | Gutowitz | 380/43 |
| 5,420,943 | A * | 5/1995 | Mak | 382/313 |
| 5,521,363 | A * | 5/1996 | Tannenbaum | 235/379 |
| 5,870,319 | A * | 2/1999 | Thornton et al. | 708/160 |
| 5,917,913 | A * | 6/1999 | Wang | 705/67 |
| 5,943,423 | A * | 8/1999 | Muftic | 705/67 |
| 6,019,393 | A * | 2/2000 | Loebner | 283/60.2 |
| 6,076,079 | A * | 6/2000 | Boston et al. | 705/400 |
| 6,175,922 | B1 * | 1/2001 | Wang | 713/182 |
| 6,226,744 | B1 * | 5/2001 | Murphy et al. | 726/5 |
| 6,282,656 | B1 * | 8/2001 | Wang | 726/4 |
| 6,305,603 | B1 * | 10/2001 | Grunbok, Jr. et al. | 235/379 |
| 6,394,341 | B1 * | 5/2002 | Makipaa et al. | 235/379 |
| 6,512,919 | B2 * | 1/2003 | Ogasawara | 455/422.1 |
| 6,516,996 | B1 * | 2/2003 | Hippeläinen | 235/379 |
| 6,532,450 | B1 * | 3/2003 | Brown et al. | 705/40 |
| 6,609,114 | B1 * | 8/2003 | Gressel et al. | 705/50 |
| 6,611,819 | B1 * | 8/2003 | Oneda | 705/41 |
| 6,678,700 | B1 * | 1/2004 | Moore et al. | 707/200 |
| 6,736,322 | B2 * | 5/2004 | Gobburu et al. | 235/462.46 |
| 6,766,956 | B1 * | 7/2004 | Boylan, III et al. | 235/462.45 |
| 6,854,641 | B1 * | 2/2005 | Takagi | 235/375 |
| 6,993,507 | B2 * | 1/2006 | Meyer et al. | 705/40 |
| 7,155,199 | B2 * | 12/2006 | Zalewski et al. | 455/403 |
| 7,158,948 | B1 * | 1/2007 | Rodriguez et al. | 705/28 |
| 2001/0018660 | A1 * | 8/2001 | Sehr | 705/5 |
| 2002/0013815 | A1 * | 1/2002 | Obradovich et al. | 709/204 |

(Continued)

OTHER PUBLICATIONS

Lanzeni, Donatella, Dec. 1998, "The vital factor for farmfactoring" in Document World, pp. 42-44 (v3n6).*
"Cardiff Ships TELEform V7: First Integrated Solution for Automated Information Capture, Processing, and Reply" dated 25th Sep. 2000.*
Lanzeni, Donatella, Dec. 1998, "The vital factor for farmfactoring" in Document World, pp. 42-44 (v3n6).*
"Cardiff Ships TELEform V7: First Integrated Solution for Automated Information Capture, Processing, and Reply" dated Sep. 25, 2000.*

*Primary Examiner*—James P Trammell
*Assistant Examiner*—Sanjeev Malhotra
(74) *Attorney, Agent, or Firm*—Thomas, Kayden, Horstemeyer & Risley, LLP

(57) ABSTRACT

Preferred embodiment of electronic financial assistant systems includes a device adapted to capture information from a financial record and a computing device that is operatively coupled to the device. The computing device is adapted to compare financial transactions incurred by a user with the information captured from the financial record. Other systems and methods are also provided.

33 Claims, 8 Drawing Sheets

U.S. PATENT DOCUMENTS

| | | | |
|---|---|---|---|
| 2002/0038277 A1* | 3/2002 | Yuan | 705/37 |
| 2004/0059651 A1* | 3/2004 | MaGuire, III et al. | 705/30 |
| 2004/0159700 A1* | 8/2004 | Khan et al. | 235/380 |
| 2004/0185494 A1* | 9/2004 | Itoh et al. | 705/15 |
| 2005/0234807 A1* | 10/2005 | Toffey | 705/37 |
| 2006/0074802 A1* | 4/2006 | Hall et al. | 705/40 |

* cited by examiner

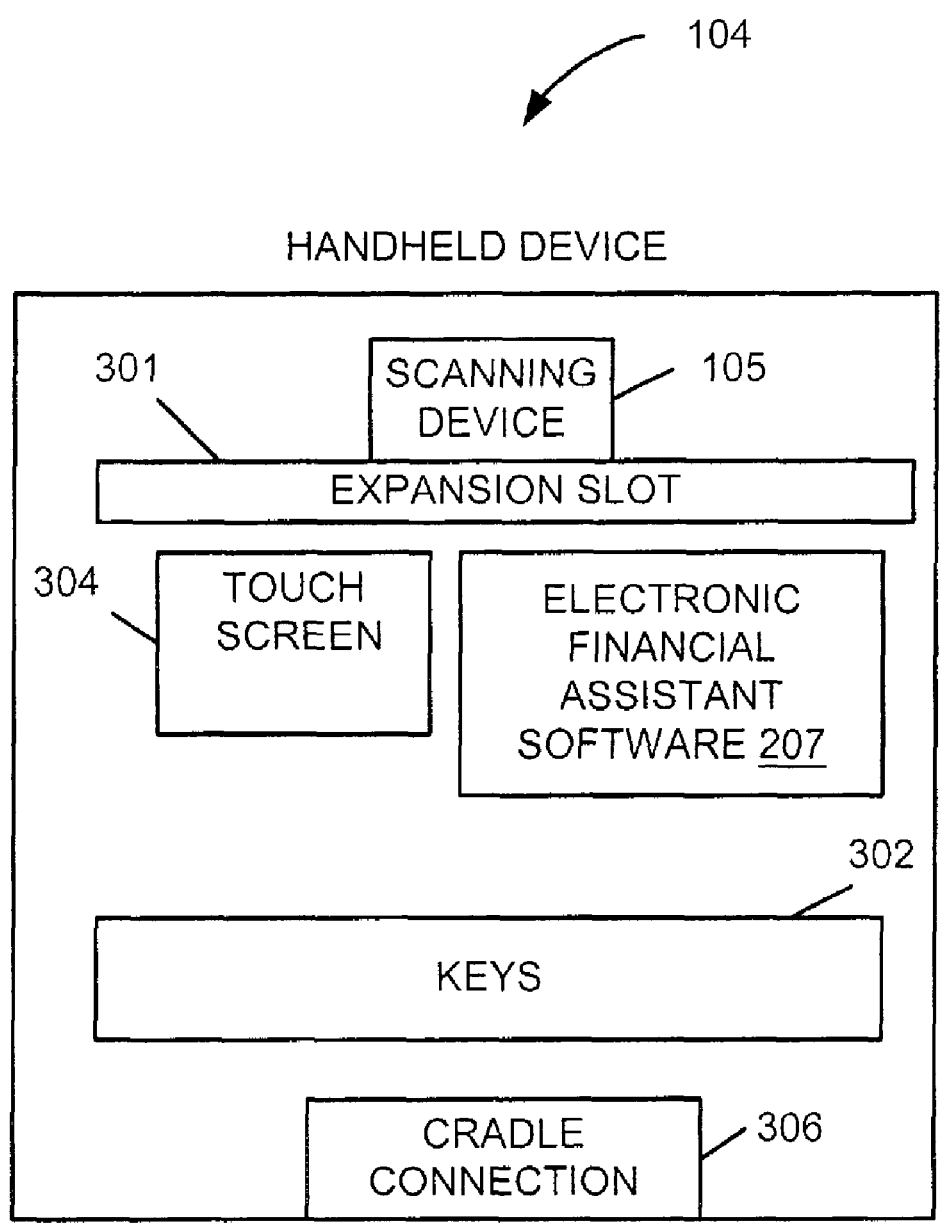

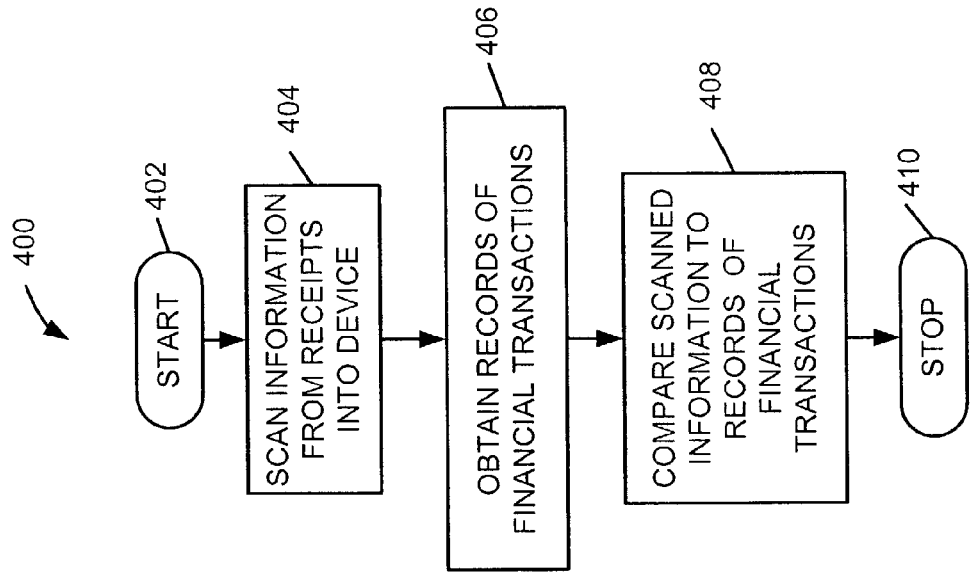

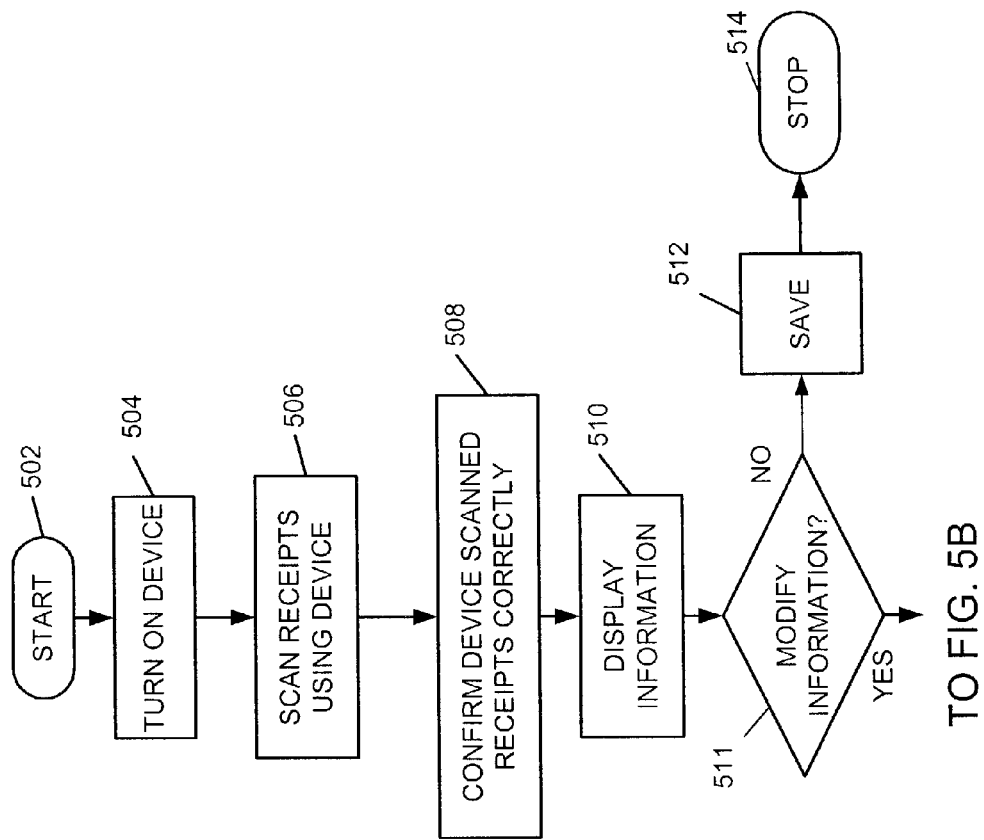

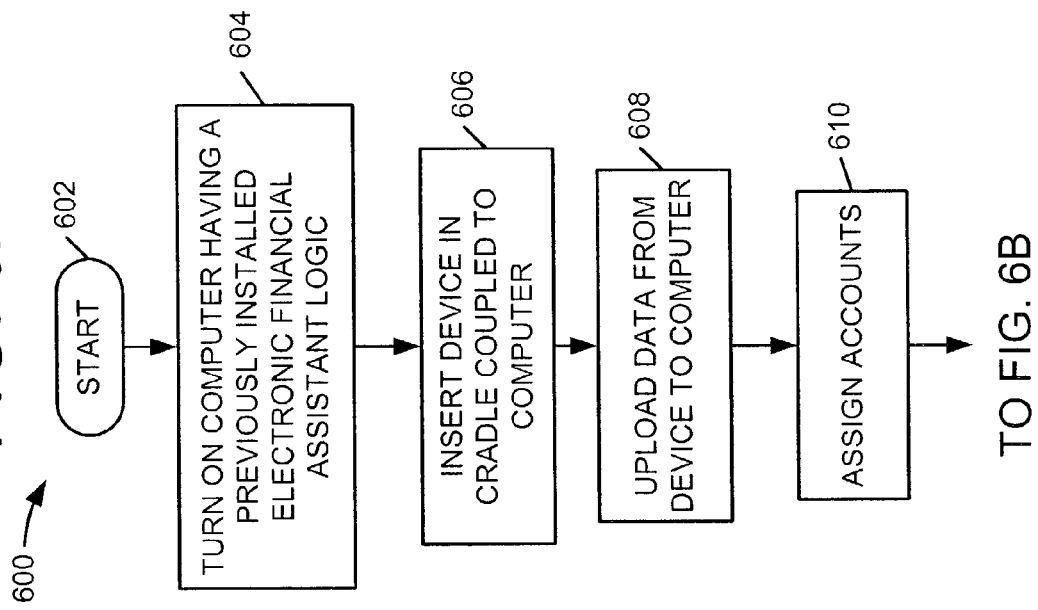

ELECTRONIC FINANCIAL ASSISTANT

TECHNICAL FIELD

The present invention is generally related to financial transactions and, more particularly, is related to an electronic financial assistant.

BACKGROUND OF THE INVENTION

In today's environment, many consumers are minimizing or even eliminating the use of cash or checks for transactions. Instead, some consumers are choosing to utilize credit or debits cards to pay for purchases. Credit and debits cards are widely accepted as payment for transactions by retailers, financial institutions, and Internet retailers, among others. As a result of using credit and debit cards, consumers are accumulating paper receipts for these transactions.

Accounting for the accuracy of transactions made with credit and/or debit cards becomes unwieldy when more than a few items are purchased or cash is obtained using a credit and/or debit card. A process for reconciling a receipt is to await a statement that is mailed to the consumer from the financial institution, and manually compare the statement to the receipt on a record of the receipt. This process must be completed for each credit and debit card used by the consumer. Further, transactions that were not listed on the current statement must be held and reconciled the following month. Another process for reconciling the receipts is to download an electronic statement from the financial institution. Again, the paper receipts are often manually compared to the electronic statement. Yet another reconciliation process involves entering information from the paper receipts into a financial software package, for instance Quicken™ or Microsoft Money™. The entered information is compared to a paper or electronic statement from the financial institution to reconcile transactions. Each of these processes involves a manual review of the paper or electronic receipts.

Reconciling credit and/or debit cards transactions is helpful because the dollar amounts billed by the financial institution may be different than amounts shown on the consumers paper receipt. For instance, when a seller utilizes a carbonless receipt, the seller, or an employee of the seller, may unscrupulously alter the amount approved by the purchaser. For example, the unscrupulous seller may add a tip amount to the portion of the carbonless receipt submitted to the financial institution for payment that is different from the amount shown on the purchaser's receipt. Discrepancies such as these may not be readily apparent unless the purchaser compares and reconciles each paper receipt with a statement from the financial institution that discloses the amount actually paid to the seller. Manual comparisons can be very time consuming and prone to errors.

Thus, a heretofore-unaddressed need exists for a solution that addresses the aforementioned deficiencies and inadequacies.

SUMMARY OF THE INVENTION

The preferred embodiments of the present invention provide systems and methods for an electronic financial assistant.

Briefly described, in architecture, one preferred embodiment of the system, among others, can be implemented as follows. An electronic financial assistant system comprises a handheld device adapted to capture information from a financial record, and a computing device operatively coupled to the device. The computing device is adapted to compare financial transactions incurred by a user with the information captured from the financial record.

The preferred embodiment of the present invention can also be viewed as providing methods for implementing an automatic transaction verification. In this regard, one embodiment of such a method, among others, can be broadly summarized by the following steps: capturing information from a financial record into a handheld device; and comparing the information from the financial record to financial statement information that includes financial transactions incurred by a user.

Other systems, methods, features, and advantages of the present invention will be or become apparent to one with skill in the art upon examination of the following drawings and detailed description. It is intended that all such additional systems, methods, features, and advantages be included within this description, and be within the scope of the present invention.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 3 is a block diagram depicting one example of a handheld device that can be used to implement the preferred embodiment of the electronic financial assistant system of FIG. 1.

FIG. 4 is a flow chart depicting general functionality, in accordance with one preferred embodiment, of an implementation of an electronic financial assistant system.

FIGS. 5A and 5B are flow charts depicting more specific functionality, in accordance with one preferred embodiment, of an implementation of an electronic financial assistant system.

FIGS. 6A and 6B are flow charts depicting more specific computing device functionality, in accordance with one preferred embodiment, of an implementation of an electronic financial assistant system.

DETAILED DESCRIPTION OF THE PREFERRED EMBODIMENTS

Disclosed herein are systems and methods for an electronic financial assistant. To facilitate description of the inventive system, an example system that can be used to implement the systems and methods for an electronic financial assistant on a personal computer and other devices is discussed with reference to the figures. Although this system is described in detail, it will be appreciated that this system is provided for purposes of illustration only and that various modifications are feasible without departing from the inventive concept. After the example system has been described, an example of the operation of the system will be provided to explain the manner in which the system can be used to provide an electronic financial assistant.

Figure 1:
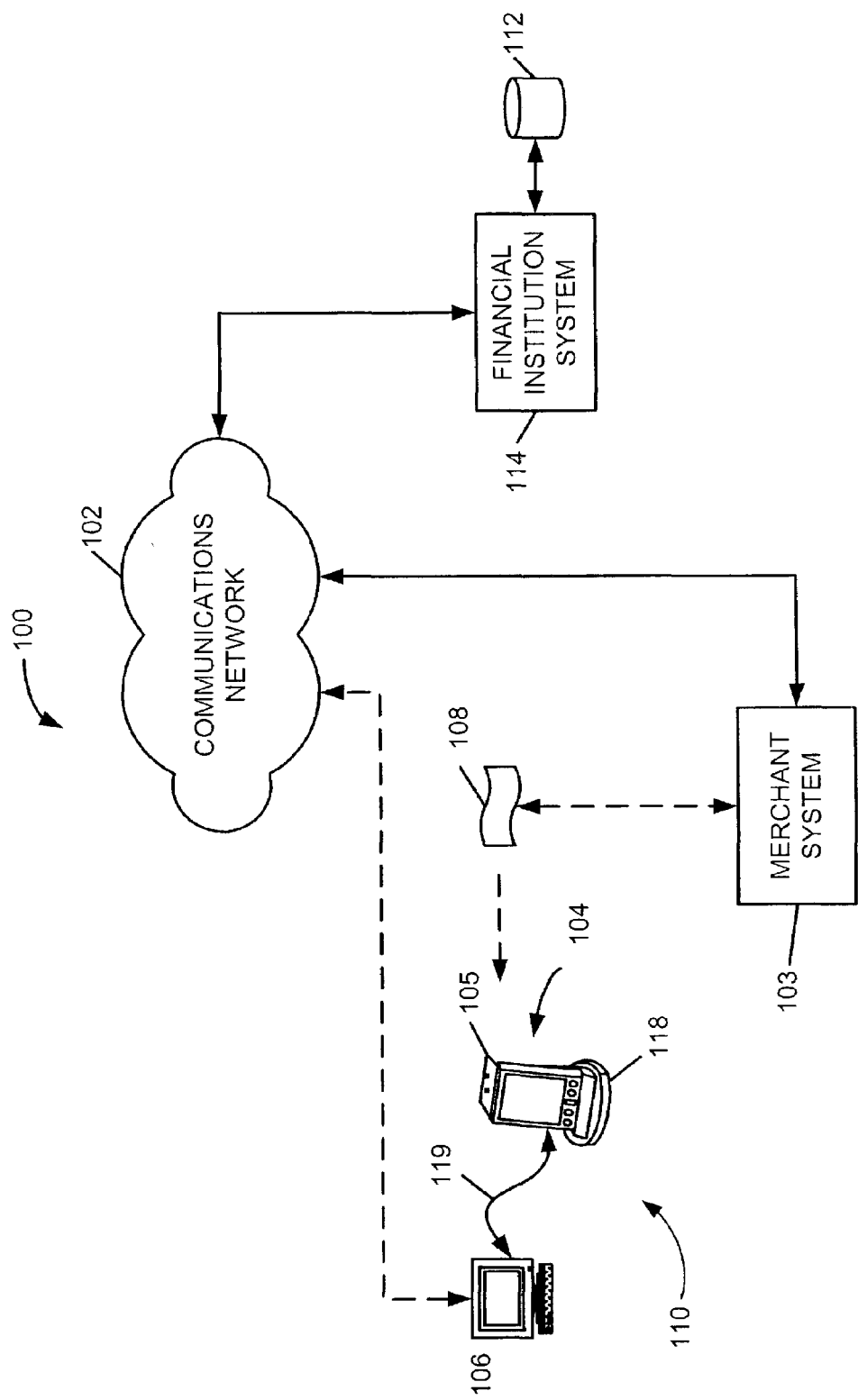
FIG. 1 is a block diagram depicting one example of an environment in which a preferred embodiment of an electronic financial assistant system is implemented.

Referring now in more detail to the drawings, in which like numerals indicate corresponding parts throughout the several views, FIG. 1 is a block diagram depicting a preferred embodiment of an environment 100 in which an electronic financial assistant system may be implemented. One example of an environment 100 includes a communications network 102, a merchant system 103, a handheld device 104, a computing device 106, a financial record, such as a paper receipt 108, a financial institution system 114, and a database 112. The database 112 includes information, such as for instance, data representing credit card and debit card transactions. The handheld device 104 and the computing device 106 preferably constitute an electronic financial assistant system 110. In one preferred embodiment, the merchant system 103 provides the financial record 108 that can be scanned into the handheld device. In a preferred embodiment, the paper receipt 108 includes a bar code printed thereon that includes embedded information describing at least an amount of transaction. In addition, such information may include a date, merchant name, etc. Of course, such information is preferably bar code encoded in a standard format understood by scanning device 105. The user utilizes the scanner 105 of the handheld device 104 to scan the bar code of the paper receipt 108 to read and store information contained in the bar code. In one example of a preferred embodiment, the handheld device 104 is a portable, battery powered device. The handheld device 104 in one embodiment is adapted for by merchant systems 103 at a merchant location. The communications network 102 may be any type of communications network employing any network topology, transmission medium, or network protocol. For example, such a network may be any public or private packet-switched or other data network, including the Internet, circuit-switched network, such as a public switch telecommunications network (PSTN), wireless network, or any other desired communications infrastructure and/or combination of infrastructure.

In a preferred embodiment the handheld device 104 includes a docking station or cradle 118 that is operative interposed between the handheld device 104 and the computing device 106, among others. The computing device 106 preferably includes software for communicating with the cradle 118. Preferably, the handheld device 104 is releasably coupled to the computing device 106 via a communications cable 119. In a preferred embodiment, the handheld device 104 is operatively, yet removably, coupled to the computing device 106 and is adapted to communicate with the financial institution system 114 via the communications network 102. The handheld device 104 can encompass handheld devices such as a Handspring Visor™, PalmPilot™ and/or RIM Wireless Handheld™. Thus, the handheld device 104 can also communicate wirelessly with a communications network, such as communications network 102 though such is not required. In a preferred embodiment, the handheld device 104 includes a scanning device 105 adapted to read a bar code.

Interfacing with the financial institution system 114 provides access to the database 112 that includes records of transactions by a purchaser that have been or will be paid by the financial institution 114. The financial institution can include for instance, a bank, credit card company, credit union, savings institution, lending company, mortgage company, and broker institution, among others. In a preferred embodiment, the database 112 includes, but is not limited to information on the dollar amount, date, time, location, merchant name, and store number for the transaction that occurred using the credit and/or debit card.

Figure 2:
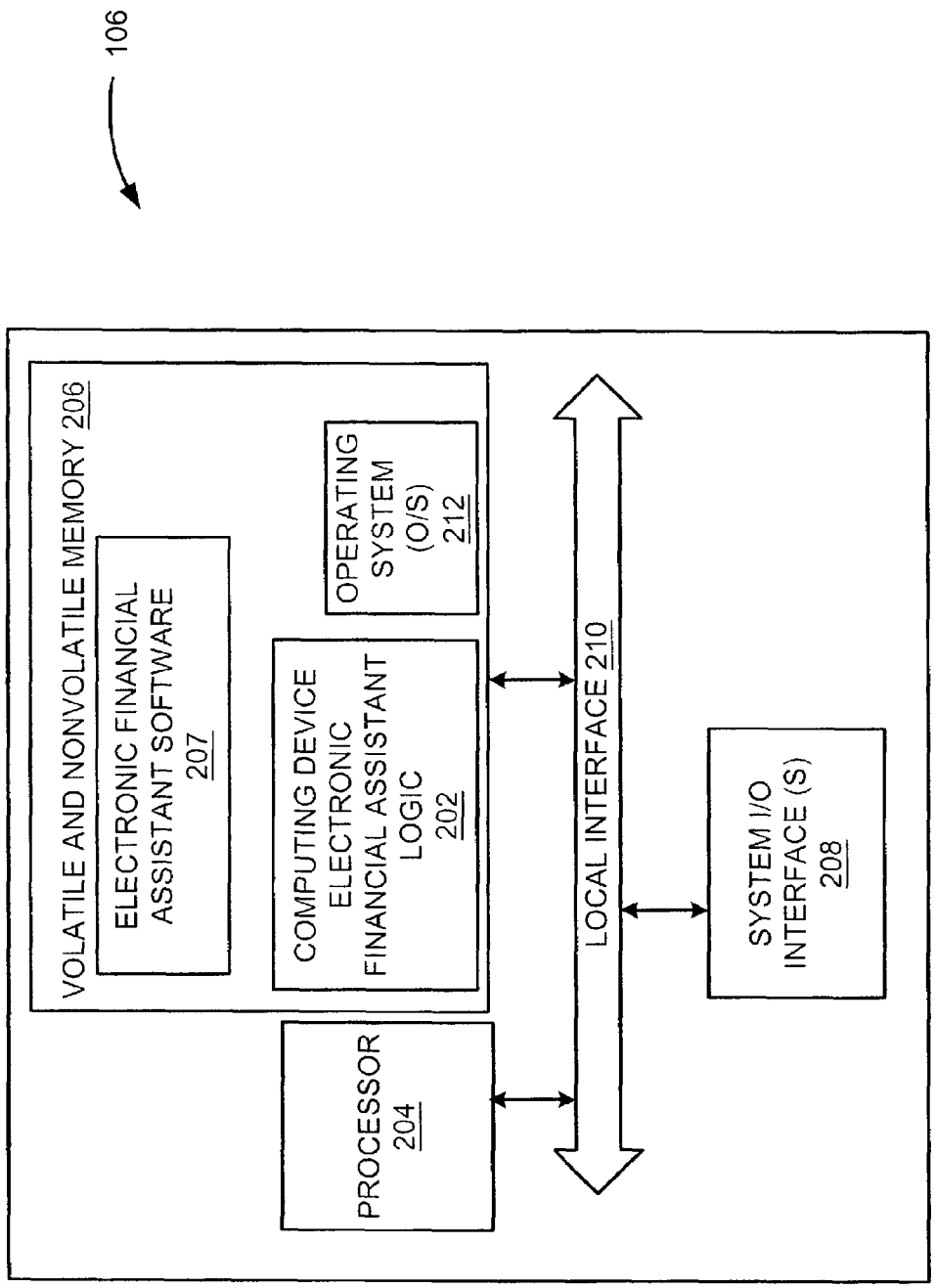
FIG. 2 is a block diagram depicting one example of a computing device that can be used to implement the preferred embodiment of the electronic financial assistant system of FIG. 1.

FIG. 2 is a block diagram depicting a computer or processor-based system that can be used to implement a preferred embodiment of the computing device 106 of the electronic financial assistant system 110. As shown in FIG. 2, computing device electronic financial assistant logic 202 can be implemented in software (e.g., programming stored on a medium, firmware, etc.), hardware, or a combination thereof. In the preferred embodiments, the computing device electronic financial assistant logic 202 is implemented in software as an executable program, and is executed by a special or general purpose digital computer, such as a personal computer (PC; IBM-compatible, Apple-compatible, or otherwise), workstation, minicomputer, or mainframe computer. An example of a general-purpose computer that can implement the computing device electronic financial assistant logic 202 of the preferred and alternate embodiments of the present invention is shown in FIG. 2.

Generally, in terms of hardware architecture, as shown in FIG. 2, the computing device 106 of the electronic financial assistant system 110 includes, inter alia, a processing device 204 and memory 206. Input and/or output (I/O) devices 208 (or peripherals) can be communicatively coupled to a local interface 210. The local interface 210 can be, for example but not limited to, one or more buses or other wired or wireless connections, as is known in the art. The local interface 210 may have additional elements, which are omitted for simplicity, such as controllers, buffers (caches), drivers, repeaters, and receivers, to enable communications. Further, the local interface 210 may include address, control, and/or data connections to enable appropriate communications among the aforementioned components.

The processing device 204 is preferably a hardware device for executing software, particularly that stored in memory 206. The processing device 204 can preferably be any custom made or commercially available processor, a central processing unit (CPU), an auxiliary processor among several processors, a semiconductor based microprocessor (in the form of a microchip or chip set), a macroprocessor, or generally any device for executing software instructions.

The software and/or firmware in memory 206 may include one or more separate programs, each of which comprises an ordered listing of executable instructions for implementing logical functions. In the example of FIG. 2, the software in the memory 206 includes the computing device electronic financial assistant logic 202, an electronic financial assistant software 207, and a suitable operating system (O/S) 212. The operating system 212 essentially controls the execution of other computer programs, such as the computing device electronic financial assistant logic 202, and provides scheduling, input-output control, file and data management, memory management, and communication control and related services.

The computing device electronic financial assistant logic 202 is preferably a source program, executable program (object code), script, or any other entity comprising a set of instructions to be performed. When the computing device electronic financial assistant logic 202 is implemented as a source program, then the program needs to be translated via a compiler, assembler, interpreter, or the like, which may or may not be included within the memory 206, so as to operate properly in connection with the O/S 212. Furthermore, computing device electronic financial assistant logic 202 can be written as (a) an object oriented programming language, which has classes of data and methods, or (b) a procedure programming language, which has routines, subroutines, and/or functions, for example but not limited to, C, C++, Pascal, Basic, Fortran, Cobol, Perl, Java, and Ada.

The I/O devices 208 may preferably include input devices, for example but not limited to, a keyboard, mouse, scanner, microphone, etc. Furthermore, the I/O devices 208 may also include output devices, for example but not limited to, a printer, display, etc. Finally, the I/O devices 208 may further include devices that communicate both inputs and outputs, for instance but not limited to, a modulator/demodulator (modem; for accessing another device, system, or network), a radio frequency (RF) or other transceiver, a telephonic interface, a bridge, a router, etc.

When the computing device electronic financial assistant logic 202 is implemented in software, as is shown in FIG. 2, it should be noted that the computing device electronic financial assistant logic 202 can preferably be stored on any computer-readable medium for use by or in connection with any computer related system or method. The computing device electronic financial assistant logic 202 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). In addition, memory 206 can include any one or combination of volatile memory elements (e.g., random access memory (RAM, such as DRAM, SRAM, SDRAM, etc.)). The memory 206 can have a distributed architecture, where various components are situated remote from one another, but can be accessed by the processing device 204. Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory. If implemented in hardware, as in an alternative embodiment, the computing device electronic financial assistant logic 202 can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

FIG. 3 is a block diagram depicting one example of the handheld device 104 that can be used to implement the preferred embodiment of the electronic financial assistant system 100. The handheld device 104 includes a scanning device 105 such as a bar code scanner for scanning bar codes on financial records, such as paper receipts 108. In a preferred embodiment, the bar code scanner 105 couples to an available expansion slot 301 of the handheld device 104. In an alternative preferred embodiment, the bar code scanner 105 is incorporated into the handheld device 104. In a preferred embodiment, the computing device 106 and handheld device 104 included respective components of electronic financial assistant software 207. The handheld device 104 includes a plurality of keys 302 such as letters and numbers that allow for user input. A touch screen 304 may be provided for user input via "soft" touch or buttons. A cradle connection 306 provides for connecting to the cradle 118 and includes electronics for enabling communications between the handheld device 104 and the computing device 106.

FIG. 4 is a flow chart 400 depicting functionality (or a method) in accordance with one preferred embodiment of an implementation of an electronic financial assistant system. The process begins at 402. At 404, information from receipts, such as those created from uses of a credit card and/or debit card, are scanned into a handheld device. In a preferred embodiment, the information is contained in a bar code on the receipts that are read by the handheld device. At 406, financial records are obtained that include the financial transactions of a user. In a preferred embodiment, the financial records include an amount of purchase or cash received using a credit and/or debit card, merchant name, a date and a location of store and/or automatic teller machine (ATM) where the transaction occurred, among others. The financial records may also include time of purchase, and a store number identifying the store where the transaction occurred. At 408, a comparison is made between the scanned information with the records of financial transactions. In one preferred embodiment, the computing device performs the steps 406 and 408. The process ends at 410.

Figure 5B:
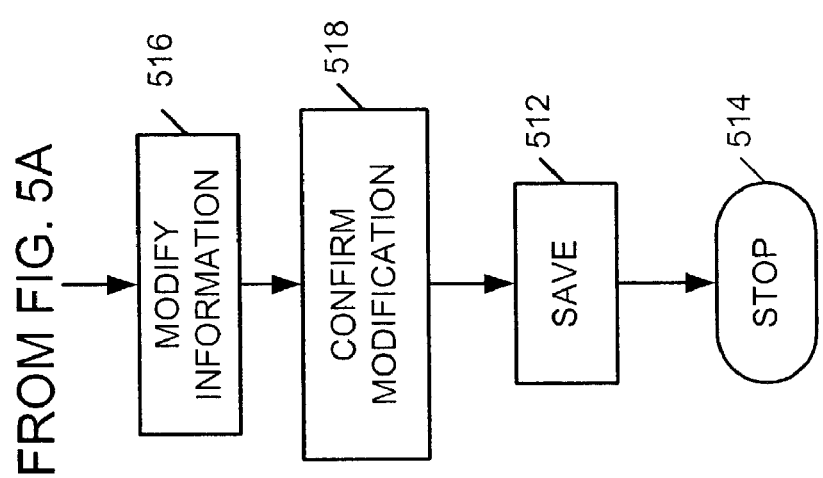

FIGS. 5A and 5B are flow charts 500 depicting more specific functionality (or a method), in accordance with one preferred embodiment of an implementation of an electronic financial assistant system. The functionality (or method) begins at 502. At 504, the handheld device is turned on. At 506, the receipts are scanned using the handheld device. At 508, a confirmation is generated and displayed for the user that the device scanned the receipts correctly. At 510, the information scanned is displayed. At 511, the user preferably has an opportunity to modify the information that has been scanned into the device. If the user is satisfied with the information as scanned and displayed, and the user does not wish to modify the information, at 512, the information is saved in the device. The process ends at 514.

Referring to FIG. 5B, if the user desires to modify the information at 511, then the user modifies the information at 516. For instance, if a credit card receipt is scanned into the device, a user may wish to modify the amount to include a gratuity. In a preferred embodiment, the user can modify the amount by preset amounts of 10%, 15% or 20%. For example, the user may press a "1" key on the handheld device to add 10% to the amount, press "2" to add 15% to the amount, and press "3" to add 20% to the amount. In some embodiments, the keys include numbers and in other embodiments, not all keys include numbers. In an alternative embodiment, the user depresses a screen on the handheld device having "soft" buttons such as those provided by the touch screen. In addition, the user can modify the amount by adding a non-preset amount to the total. In a preferred embodiment, the user is prompted as to whether they wish to add "other amount." The user enters yes or no. If the user presses yes, the user enters a particular percentage or dollar amount to be added to the credit or debit amount scanned from the credit card. If the user presses no, the amount remains the same as the scanned amount. The handheld device automatically calculates the additional amount or the percentage amount to be added to the amount scanned from the credit and/or debit card. A new total is displayed for confirmation.

In another preferred embodiment, the user modifies the information scanned into the handheld device by selecting from various categories presented to the user. In a preferred embodiment, the categories include, but are not limited to, memo, note, business, personal, home or other (e.g. category defined by the user). The user can enter data or text into handheld device by category using for instance, an associated keyboard and/or a stylus depressed on a touch screen.

At 518, the user confirms the modifications performed at 516. The information is saved at 512. In a preferred embodiment, the information is stored in memory of the handheld device. In another preferred embodiment, the information is stored in memory of the handheld device and uploaded to memory of a computing device. In still another preferred embodiment, the information is stored directly in the computing device, if the handheld device is continuously connected to the computing device. The process ends at 522.

Figure 6B:
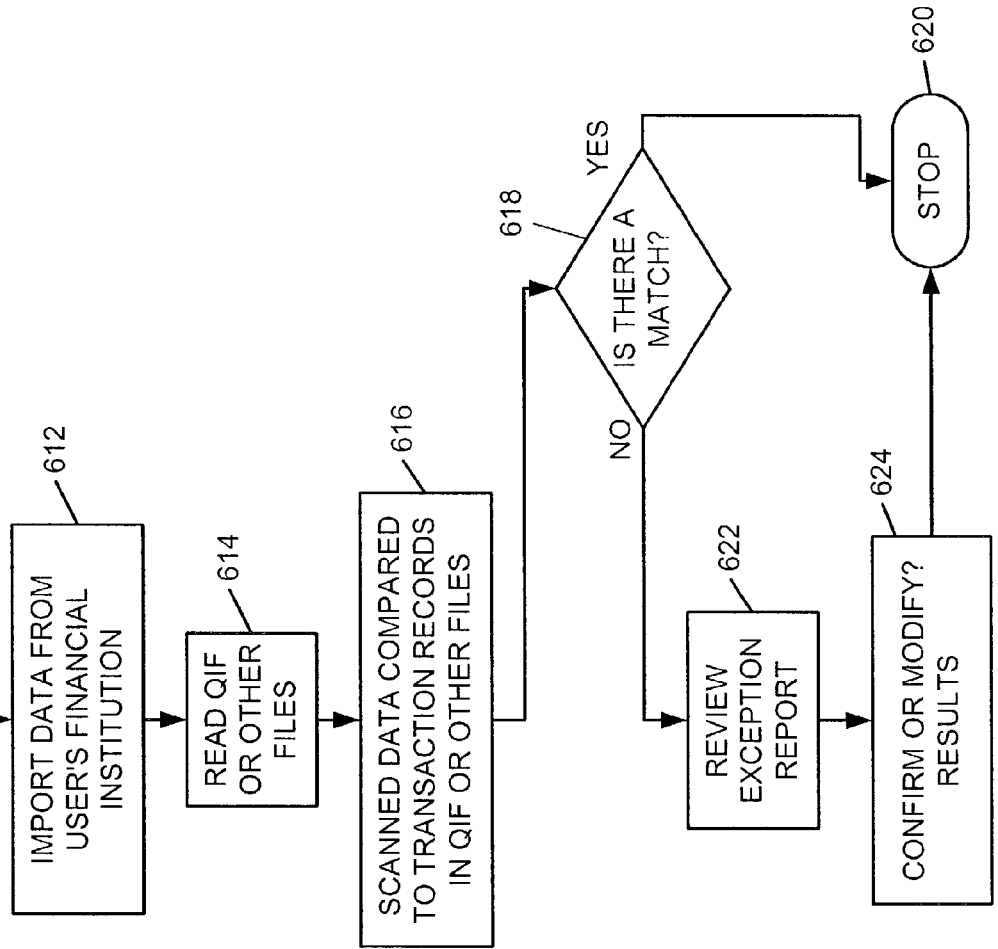

FIGS. 6A and 6B are flow charts 600 depicting functionality (or a method) in accordance with one preferred embodiment of the implementation of an electronic financial assistant system. The process begins at 602. In a preferred embodiment, the methods as described in FIGS. 5A and 5B have been substantially implemented and credit and/or debit card receipts have been scanned into the handheld device. At 604, a computing device, such as a computer is turned on. Previously, the computing device electronic financial assistant logic was installed on the computing device. At 606, the handheld device is inserted in a cradle that is operatively coupled to the computer, which allows the cradle and handheld device to communicate with the computing device. The data in the handheld device is uploaded from the handheld device to the computer at 608. If not previously assigned, the data can be assigned accounts at 610. In a preferred embodiment, accounts include categories such as business, travel and family, among others.

Referring to FIG. 6B, at 612, data is imported from the user's financial or other institution system. In a preferred embodiment, the user connects to the Internet or other communications network using the computing device. Once connected to the Internet, the user can access a web site for their financial institution, and download statement information on charges incurred by the user or payments made by the financial institution on behalf of the user. Due to the proliferation of software packages such as Quicken™ and Microsoft Money™ that are used by consumers to manage their finances, many financial institutions provide transaction statements in a format compatible with these software packages. For instance, many financial institutions provide files in Quicken Interchange Format (QIF)™ which is a file specially formatted as an American Standard Code for Information Interchange (ASCII) text file used to transfer data between Quicken™ data files and other financial programs. The electronic financial assistant logic is compatible with (QIF)™ files. At 614, the user reads (QIF)™ or other files containing transaction records of the user's charges or debits. At 616, the electronic financial assistant logic compares the scanned data to the transaction records. In a preferred embodiment, the comparison involves searching for a match between date, amount and store. At 618, a determination is made as to whether the scanned data matches the transaction records. If yes, the process stops at 620. If no, at 622, an exception notification, such as an exception report, is generated. At 624, the user has an opportunity to confirm or modify information based on the exception report. For instance, if the difference between the scanned data and the transaction record is nominal, the user may decide to take no action and confirm the results. If the difference is not nominal, the user may decide to add a note to the scanned information, such as for instance, "contact store regarding charge." The user can subsequently review the notes and the user can take appropriate action. The user reviews each exception report until all exceptions have been accounted for. The process ends at 620.

Any process descriptions or blocks in flow charts should be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

In one example of operation of the system, using the handheld device a user scans, reads and stores data regarding a bar code on the paper receipt. Subsequently, the handheld device is inserted in a cradle that is operatively coupled to the computing device for enabling the handheld device to communicate with the computing device. Through software in the handheld device and computing device, information in the handheld device is uploaded from the handheld device to the computing device. Subsequently, and perhaps after several different and separate uploading processes, in a preferred embodiment, a user connects to the Internet or other communications network using the computing device and conventional communication software. Once connected to the Internet, the user can access, for example, a web site for the financial institution system for instance, via the financial software application. Data from the financial institution system, or other server, is imported to the computing device. The user can download statement information from the database containing information such as statements that include charges incurred by the user, or payments made by the financial institution on behalf of the user, to the computing device or handheld device. As discussed above, the computing device or handheld device includes computing device electronic financial assistant logic that compares the scanned data uploaded from the handheld device, to the transaction records downloaded from the database. The user receives notification of records that do not match. In a preferred embodiment, an exception report is displayed on the computing device. The user can modify or confirm the information displayed in the exception report. When finished modifying and/or confirming entries related to the exception report, the user can save the information in the computing device and/or download the information to the handheld device. In other embodiments, the computing device downloads the statement information to the handheld device, which performs the comparisons and notifies the user.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

The invention claimed is:

1. An electronic financial assistant system, comprising:
a handheld device adapted to capture information from a financial record, the handheld device comprising a scanner for scanning a paper receipt financial record of a user to capture an image of the paper receipt financial record;
a computing device operatively coupled to the handheld device, the computing device adapted to compare the information from the financial record to financial statement information;
the financial record further comprises a bar code;
the handheld device is a portable, battery powered device for use at a merchant location; and
the handheld device is configured to provide for modifying the information captured from the financial record.

2. The system of claim 1, wherein the information from the financial record is at least one of a dollar amount, date, store location, merchant name, store number or time.

3. The system of claim 1, further comprising a docking station operatively interposed between the handheld device and the computing device, the docking station adapted to upload information from the handheld device to the computing device.

4. The system of claim 3, wherein the handheld device is releasably coupled to the docking station.

5. The system of claim 1, wherein the computing device is configured to provide an exception report when the information from the financial record does not match the a bank statement of the user.

6. The system of claim 1, wherein the handheld device is configured to automatically add a gratuity to a dollar amount included in the information captured from the financial record.

7. The system of claim 1, wherein the handheld device is adapted to confirm the information to be saved in the handheld device.

8. The system of claim 1, wherein the computing device is configured to import the financial statement information from a processor that includes the financial transactions incurred by the user such that the imported financial statement information is compared to the information captured from the financial record.

9. A method for automatic transaction verification using an electronic financial assistant, comprised of:
scanning a paper receipt comprising a financial record of a user into a handheld device to capture an image of the paper receipt financial record;
capturing information from the financial record into the handheld device;
comparing the information from the scanned financial record to a bank statement of the user;
modifying the information from the scanned financial record;
the handheld device is a portable, battery powered device for use at a merchant location;
the scanning a paper receipt comprising a financial record into a handheld device further comprises reading a bar code on the paper receipt; and
the modifying the information captured from the financial record further comprises modifying an amount captured from the financial record.

10. The method of claim 9, wherein the modifying the information captured from the financial record further comprises automatically computing a gratuity amount to be added to the information captured from the financial record.

11. The method of claim 9, wherein the modifying the information captured from the financial record further comprises adding text to the information captured from the financial record.

12. The method of claim 9, further comprising displaying the information captured from the financial record.

13. The method of claim 12, further comprising confirming an amount displayed from information captured from the financial record.

14. The method of claim 9, further comprising saving the information captured from the financial record.

15. The method of claim 9, further comprising uploading the information captured from the financial record from the handheld device to a computing device.

16. The method of claim 15, wherein the uploading the information captured from the financial record from the handheld device to a computing device is performed using a docking station adapted to communicate with the handheld device and the computing device.

17. The method of claim 9, further comprising importing the a bank statement of the user from a financial institution.

18. The method of claim 9, further comprising providing a notification when the information from the financial record does not match the a bank statement of the user.

19. The method of claim 9, further comprising assigning the information from the financial record to an account.

20. The method of claim 9, wherein the capturing information from the financial record into the handheld device is performed with the information comprising at least one of a dollar amount, date, name of institution where transaction occurred, or time.

21. The method of claim 9, further comprising reviewing the a bank statement of the user and confirming the financial transactions incurred by the user.

22. A computer-readable medium having logic for an electronic financial assistant utilizing a hand held device, comprising:
logic configured in a first computer readable medium to scan a paper receipt of a user comprising a financial record to capture an image of the paper receipt financial record and to capture information from the financial record into a device;
logic configured in a second computer readable medium to compare the information from the scanned financial record to a bank statement of the user and to modify the information from the scanned financial record;
the logic configured to scan the paper receipt comprising the financial record further comprises logic configured to read a bar code affixed on the financial record;
the logic configured to modify the information captured from the financial record further comprises logic configured to modify an amount captured from information on the financial record; and
the handheld device is a portable, battery powered device for use at a merchant location.

23. The computer-readable medium of claim 22, wherein the logic configured to modify the information captured from the financial record further comprises logic configured to automatically compute a gratuity amount to be added to the information captured from the financial record.

24. The computer-readable medium of claim 22, wherein the logic configured to modify the information captured from the financial record further comprises logic configured to add text to the information captured from the financial record.

25. The computer-readable medium of claim 22, further comprising logic configured to display the information captured from the financial record.

26. The computer-readable medium of claim 25, further comprising logic configured to confirm an amount displayed from information captured from the financial record.

27. The computer-readable medium of claim 22, further comprising logic configured to save the information captured from the financial record.

28. The computer-readable medium of claim 22, further comprising logic configured to upload the information captured from the financial record from the device to a computing device.

29. The computer-readable medium of claim 22, further comprising logic configured to import the a bank statement of the user from a financial institution.

30. The computer-readable medium of claim 22, further comprising logic configured to provide an exception notification when the information from the financial record does not match the a bank statement of the user.

31. The computer-readable medium of claim 22, further comprising logic configured to assign the information from the financial record to an account.

32. The computer-readable medium of claim 22, further comprising logic configured to review the a bank statement of the user and to confirm financial transactions incurred by the user.

33. The method of claim 9, further comprising automatically computing a gratuity amount to be added to the information captured from the financial record.

\* \* \* \* \*